United States Patent [19]

Hauk et al.

[11] 4,206,055
[45] Jun. 3, 1980

[54] HOUSEHOLD WATER FILTER

[75] Inventors: Dale I. Hauk, Pinckney; Gerald Tanny, Ann Arbor; William G. Presswood, Ypsilanti, all of Mich.

[73] Assignee: Gelman Instrument Company, Ann Arbor, Mich.

[21] Appl. No.: 966,535

[22] Filed: Dec. 4, 1978

[51] Int. Cl.² .................. B01D 25/06; B01D 35/22
[52] U.S. Cl. .................... 210/315; 210/287; 210/446; 210/456
[58] Field of Search .......... 210/269, 282, 283, 287, 210/290, 446, 449, 456, 459, 460, 254, 315

[56] References Cited

U.S. PATENT DOCUMENTS

| 363,120 | 5/1887 | Cummings | 210/449 X |
|---|---|---|---|
| 1,081,563 | 12/1913 | Alsterberg | 210/456 X |
| 1,261,439 | 4/1918 | Richards | 210/449 X |
| 1,496,713 | 6/1924 | Kuhn et al. | 210/456 X |
| 4,025,438 | 5/1977 | Gelman et al. | 210/484 |
| 4,107,046 | 8/1978 | Corder | 210/449 X |

Primary Examiner—William A. Cuchlinski, Jr.
Attorney, Agent, or Firm—Reising, Ethington, Barnard, Perry & Brooks

[57] ABSTRACT

The invention provides a water filter, particularly suited for household use, with valving which enables either a bypass mode or a filtering mode. During the filtering mode the water flows through a number of filtering layers one of which is a microporous membrane and during the bypass mode the water flows parallel to and against the membrane so as to cleanse the membrane of material accumulated thereon during the filtering mode.

4 Claims, 1 Drawing Figure

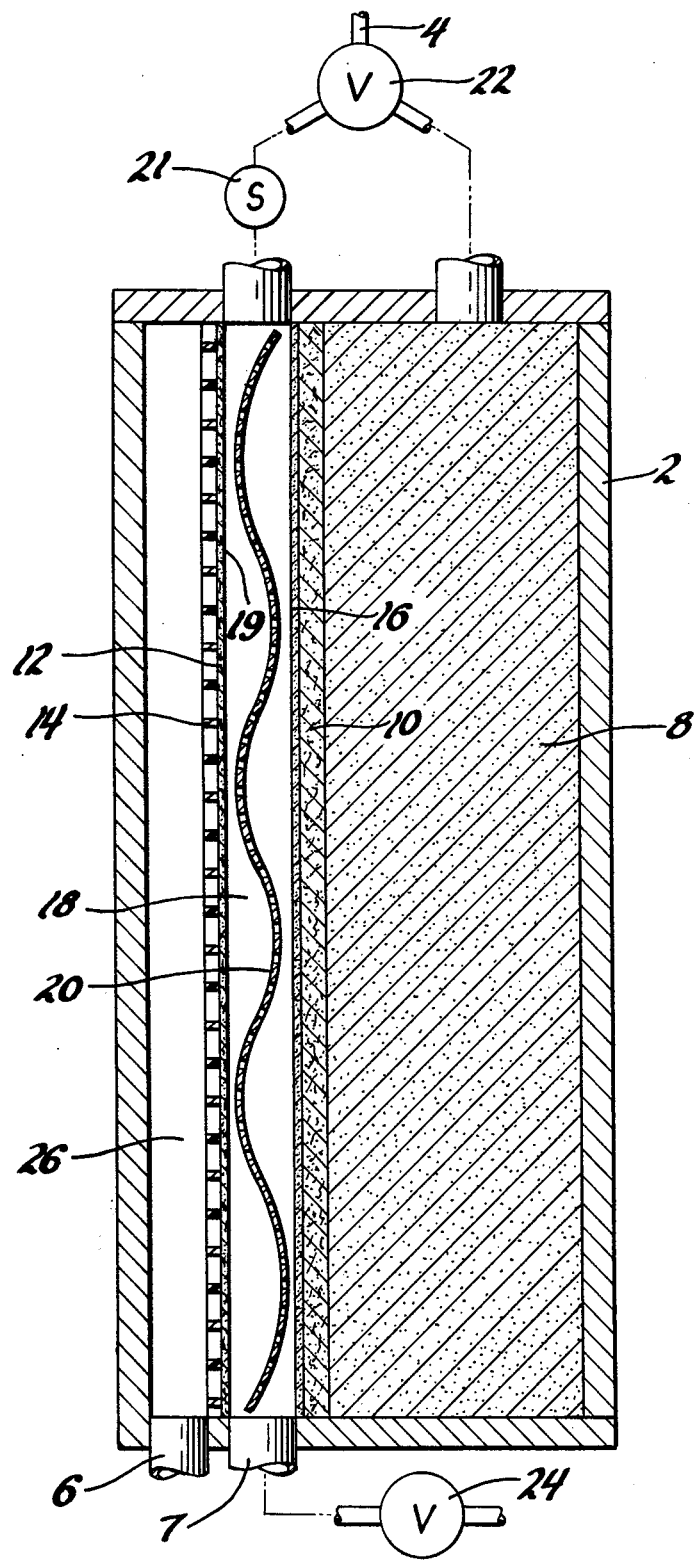

HOUSEHOLD WATER FILTER

TECHNICAL FIELD

The subject matter of the present invention is a water filter particularly suited for household use as by connection to a water faucet.

BACKGROUND ART

The prior art shows water filters wherein the water is caused to flow through a plurality of filtering layers, one of which layers is a porous membrane of submicron pore size. The submicron pore size membrane is an important element in such filters in that it not only blocks the passage of submicron deleterious solids such as asbestos, grit and the like, but it also blocks the passage of bacteria. The prior art also shows that such filters can be provided with valving whereby the water can be caused to bypass the filter whenever potable water is not required. This extends the life of the filter for providing potable water when it is needed for drinking and cooking. U.S. Pat. No. 4,025,438 shows such a filter.

But even with the bypass feature and the other features described in the aforesaid patent for extending the life of the filter, it does, nevertheless, have only a limited period of usefulness. And the limitation is due to the membrane, the useful life of which is tolled by one or the other, or both, of two conditions occurring.

One of the conditions which can arise is that the surface of the membrane becomes clogged with submicron or larger particles of any sort. Of course, where the water being filtered contains considerable solid material of sufficiently small particle size to escape filtration by earlier filter layers, this condition can arise after a relatively short period of filter use.

The other condition which can arise is by way of bacteria filtered from the water, and the growth or multiplication of the bacteria. It is a strange fact that even though a submicron pore size filter can block the flow of bacteria therethrough, nevertheless the bacteria can multiply and grow through the pores of the filter. That is, after some bacteria are captured on the upper or water entrance surface of the submicron pore size filter layer, they can, given the time to do so, culture and multiply progressively through the pores until they appear on the water exit surface of the filter layer, then to appear in water passed through the filter. The occurrence of this condition can be prevented or inhibited by the use of a bactericide in the filter; however, this has disadvantage in that no matter the conventionally used bactericides are substantially insoluble in cold water, they do have some solubility in warm water thereby giving rise to the possibility of being ingested if warm drinking or cooking water is drawn from the filter.

DISCLOSURE OF THE INVENTION

The filtering device of the present invention incorporates a plurality of filtering layers one of which is of submicron pore size, thereby to block the passage of submicron particles and bacteria, but with this submicron pore size layer being spaced from the other layers to provide a channel for the flow of water parallel to and against the water entrance surface of the submicron pore size layer. The filter is provided with appropriate valving to cause the water either to flow through the filter for filtration thereby, or to bypass such filtration but with this bypass water flowing through the aforesaid channel to cleanse the submicron pore size layer. Hence, the continued accumulation of particles or bacteria on the submicron pore size layer is inhibited thereby significantly extending the useful life of the filter.

BRIEF DESCRIPTION OF DRAWING

In the drawing there is shown a side view in section of a filter embodying the invention.

BEST MODE FOR CARRYING OUT THE INVENTION

Referring now to the drawing, the filter shown comprises a casing 2 of rectangular cross section, a water inlet 4, and two water outlets 6 and 7. The casing contains a plurality of filtering layers, layer 8 being activated charcoal particles, layer 10 being of a fibrous material and having a pore size of from about 1 to 10 microns, and layer 12 being a submicron pore size porous layer, preferably a membrane, having a pore size of from 0.02 to 0.5 microns. This submicron pore size layer is supported by a perforated wall, such as grid 14, suitably secured to the casing, and the filter layer 10 is supported by a porous rigid backing 16, the porosity of the backing being much greater than that of the filter layer 10. As in the filter shown in the aforesaid patent, so also in this embodiment of the present invention, the charcoal is primarily to remove deleterious dissolved materials in the water and the filter layer 10 is to remove relatively large size solids and to block passage of the charcoal particles to the surface of the membrane 12.

The submicron pore size filter layer 12 and the backing 16 for the filter layer 10 are parallel to, and spaced from, each other thereby providing a flow channel 18, one wall of which flow channel is formed by the water entrance surface 19 of the submicron pore size filter layer. A perforated rigid sheet 20 of sinuous cross section is suitably secured in the channel 18 and functions as a means for creating turbulence in the water flowing through the channel.

The water inlet 4 has a valve 22 which is manually operable to selectively cause the water to flow into the charcoal layer 8 or to flow into the channel 18. A suction breaker 21 is interconnected between the valve 22 and the channel 18. The outlet 7 of the channel 18 also has a manually operable valve 24 to selectively either allow or block the flow of water from the channel.

In operation, when it is desired to draw unfiltered water, the valve 22 is positioned to cause the water from the inlet 4, which ca be a faucet, to flow through the suction breaker 21 and into and through channel 18; the valve 24 being set in its open position to enable the water to flow out of the channel. When it is desired to filter the water, the valve 22 is positioned to cause the water from the inlet 4 to flow into the charcoal layer; the valve 24 being then moved to its closed position, preferably after any unfiltered water in the channel has been allowed to flow out of the channel. The water entering the charcoal layer flows therethrough and then through the filter layer 10, the porous backing 16, across the channel, through the perforated sheet 20, and through submicron pore size filter layer 12 whereupon it enters and flows longitudinally down through channel 26 and then exits through the outlet 6. In the course of filtering the water, the water-entrance surface of the submicron pore size filter layer 12, which is the surface forming the wall of the channel 18, accumulates bacteria and other solid material thereon. However, when periodically the valves are positioned to provide the filter bypass mode, the water flowing longitudinally through the channel 18 flows against the surface 30 and thereby cleanses the surface of the bacteria or other solid material. The turbulence of the water flowing through the channel, caused by the turbulence-inducing sheet 20, assists this cleansing action. The suction breaker 21 permits drainage through the valve 24 when the filter is not in use.

It will be understood that while the invention has been described specifically with respect to a particular embodiment thereof, various changes and modifications may be made all within the full and intended scope of the claims which follow.

What is claimed is:

1. A water filtering device comprising a plurality of filtering layers one of which is a submicron pore size porous membrane having an entrance surface for receiving water to be filtered by said membrane by flow therethrough after the water has flowed through other of the filtering layers, means for causing water to flow through all of said filtering layers for filtration thereby, and means for causing water to bypass filtration thereof by said membrane and to cause it to flow in a path parallel to and in contact with said surface of said membrane thereby to cleanse said surface.

2. A water filtering device comprising a casing containing a plurality of filtering layers one of which layers is a submicron pore size porous membrane having an entrance surface for receiving water to be flowed through said membrane for filtration thereby after the water has flowed through other of the filtering layers, and a channel through said casing extending parallel to said surface, said surface forming a wall of said channel.

3. A water filtering device as set forth in claim 2 and including means in said channel for causing turbulence in water flowing therethrough.

4. A water filtering device as set forth in claim 2 and including means for draining water from within the casing when not in use.

* * * * *

UNITED STATES PATENT AND TRADEMARK OFFICE
CERTIFICATE OF CORRECTION

PATENT NO. : 4,206,055
DATED : June 3, 1980
INVENTOR(S) : Dale I. Hauk, Gerald Tanny, William G. Presswood It is certified that error appears in the above—identified patent and that said Letters Patent is hereby corrected as shown below:

Column 2, line 22 (Specification page 3, line 24) "0.02" should be --0.2--.

Column 2, line 51 (Specification page 4, line 22) "ca" should be --can--.

Signed and Sealed this

Twenty-fifth Day of November 1980

[SEAL]

Attest:

SIDNEY A. DIAMOND

*Attesting Officer*  *Commissioner of Patents and Trademarks*